United States Patent [19]
Young

[11] 3,817,550

[45] June 18, 1974

[54] VEHICLE SUSPENSION SYSTEM AND BEARING CONSTRUCTION THEREFOR

[75] Inventor: Edward L. J. Young, Muskegon, Mich.

[73] Assignee: Lear Siegler, Inc., Santa Monica, Calif.

[22] Filed: Nov. 15, 1972

[21] Appl. No.: 306,550

[52] U.S. Cl. .............................. 280/104.5 A, 308/26
[51] Int. Cl. .............................................. B60g 5/02
[58] Field of Search ....... 280/104.5 A; 308/26, 238, 308/DIG. 7

[56] References Cited
UNITED STATES PATENTS

| | | | |
|---|---|---|---|
| 3,239,286 | 3/1966 | Harrison | 308/26 |
| 3,357,758 | 12/1967 | Miller | 308/26 |
| 3,367,677 | 2/1968 | Preddy | 280/104.5 A |

Primary Examiner—Philip Goodman
Assistant Examiner—John A. Carroll
Attorney, Agent, or Firm—McGarry & Waters

[57] ABSTRACT

A vehicle suspension construction in which axles of vehicles are supported by a suspension system coupled to the vehicle through at least one structural cylindrical support such as a shaft. The suspension system has a collar which surrounds the cylindrical support and is separated therefrom by a novel bearing construction including a yielding cylindrical member such as a rubber bushing compressed radially inwardly by the collar and a substantially cylindrical lubricating liner between the yieldable member and the cylindrical support to permit rocking of the suspension system or portions thereof about the cylindrical support. In one embodiment, the collar is in two parts and is tightened against the compressible member. In another embodiment, the collar is an annular cylinder as, for example, on the end of a rockable arm, and the yieldable member is compressed by being press-fit into the annular cylinder. A sleeve on a shaft forms the cylindrical support and the liner is positioned between the yieldable member and the sleeve in this second embodiment. The lubricating liner which can be made of a self-lubricating material such as Teflon, polyethylene, polypropylene, etc., is split and has an inner diameter or inner circumference slightly less than the outer diameter of the cylindrical support to leave a space for expansion of the liner due to wear in the use of the suspension system. The liner is protected from dirt, moisture, etc., by the yieldable member which extends over the ends of the liner and in contact with the cylindrical support.

13 Claims, 6 Drawing Figures

VEHICLE SUSPENSION SYSTEM AND BEARING CONSTRUCTION THEREFOR

BACKGROUND OF THE INVENTION

1. Field of the Invention

This invention relates to suspension systems for vehicles such as trailers and the like. In one of its aspects, the invention relates to a vehicle suspension system employing a novel bearing construction between a cylindrical support and a portion of the suspension system rockable about the shaft, the bearing construction including a compressed yieldable bushing member.

2. State of the Prior Art

In certain vehicle suspensions for mounting the frame or beds of the vehicle on wheels, it is common practice to provide a trunnion shaft secured to the vehicle and to provide a yieldable connection between trunnion shaft and the suspension system. Normally, the yieldable connection includes a yieldable bushing member, such as rubber, compressed by a collar-like member about the trunnion shaft. An example of such a yieldable connection is disclosed by VanRaden in U.S. Pat. No. 2,481,891.

In such systems, the yieldable bushing member acts as a cushioning member and a torsional spring between the trunnion shaft which is relatively fixed with respect to the vehicle frame and the suspension system which may contain resilient springs, air cushioning systems and the like. The suspension system thus may provide some relative rocking movement between the collar surrounding the shaft and the shaft itself. It has been found desirable in certain instances, for example, in flat bed trailers and dump trailers to provide more free rotation of the suspension system about the trunnion or other load bearing shafts.

Masser, in U.S. Pat. No. 3,018,143, discloses and claims a bearing construction for such a vehicle suspension which permits relatively free movement of the suspension system around a trunnion or other type of load bearing shaft. In the Masser system, a bearing means formed of a generally nonmetallic material has portions lying on a substantially cylindrical surface of the shaft and extending angularly not substantially more than 180 degrees around the shaft. A rockable member has a collar which surrounds the bearing means and the shaft, and has lubricating ports for providing lubricant to the interior portions thereof. Compressable rings at the ends of the bearing means seal the bearing means from dirt, moisture, etc.

In other vehicle suspension systems which may or may not have trunnion bearings of the nature described above, radius rods are provided between relatively rigid brackets which are secured to the frames and resiliently movable axles which are supported by springs or other suitable members. Rotatable joints including rubber bushings are provided between the arms and the frame bracket on one end and the axle mounting at the other end. These rubber bushings are usually press-fit into a cylindrical collar at the end of the arm and include a shape-retaining annular metal cylinder within the rubber bushing. The shape-retaining annular cylinder is secured rigidly to the shaft supports and is immovable with respect thereto. The rubber bushings act as springs as the radius rods rotate about the shafts. When the elastic limit of the bushings is exceeded, the rubber rotates with respect to the annular cylinder and the bushing eventually disintegrates.

In still other types of vehicle suspension systems, joints are made between weight bearing axles and suspension members. These joints employ a compressed rubber bushing in substantially complete contact with the weight bearing axle and allow rather limited rotational movement between the axle and the suspension members. In these joints as in the radius rod joints, the rubber bushings disintegrate when the rubber rotates with respect to the weight bearing axle.

SUMMARY OF THE INVENTION

The invention provides a suspension system for a vehicle which includes a rockable joint between a cylindrical support such as an axle, trunnion, or the like, and a suspension component which includes a collar which encircles the cylindrical support. A bearing structure is provided between the collar and the cylindrical support, the bearing structure including a yieldable member surrounding a portion of the support and within the collar, the collar compressing the yieldable member radially inwardly toward the support. According to the invention, a substantially annular linear is positioned within the yieldable member and extends at least substantially completely around the support and in contact therewith. the liner has lubricating properties and thereby provides a lubricated surface for movement of the bearing about the support.

The liner is longitudinally split and has an inner diameter slightly less than the outer diameter of the support so that a small slot is formed at the split edge of the liner to permit adjustment of the liner about the support. In this manner, substantially complete contact is maintained between the liner and the support despite any wear which may occur on the liner due to rocking of the bearing structure about the support.

The liner can be made of any lubricating material such as self-lubricating organic materials including polytetrafluor-ethylene (Teflon), polyethylene, polypropylene, and the like. The liner can also be made of inorganic fiberous material having lubricating qualities. An example of such material is known commercially as Gatke which is a relatively thick, form-retaining brake liner material. The fiberous material may be woven or unwoven fibers which may or may not be reinforced with metallic strands. The bearing material desirably is impregnated for self-lubrication.

In one embodiment, an annular cylindrical shape-retaining sleeve is rigidly mounted on a shaft and the liner surrounds the cylindrical sleeve, the sleeve and shaft forming the cylindrical support.

Desirably, the yieldable member extends over the ends of the liner and contacts the support to seal the liner against dirt, moisture and the like.

BRIEF DESCRIPTION OF THE DRAWINGS

The invention will now be described with reference to the accompanying drawings in which.

DETAILED DESCRIPTION OF THE PREFERRED EMBODIMENT

Figure 1:
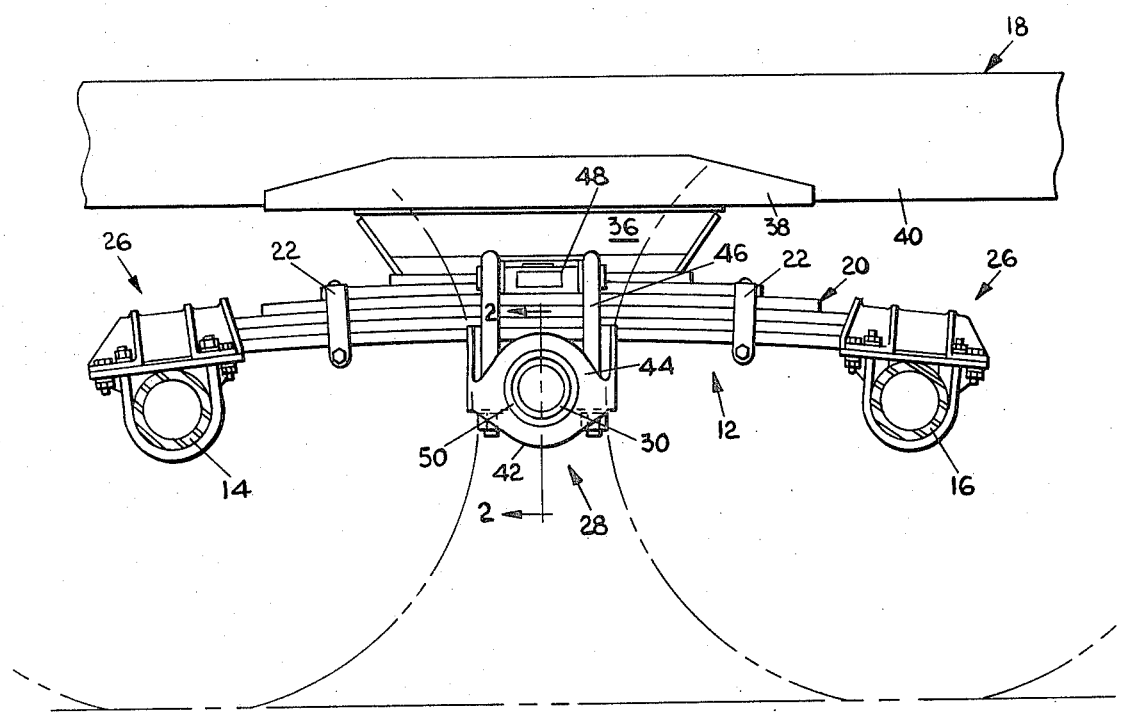
FIG. 1 is a side elevational view of a suspension system according to the invention, and illustrating a first embodiment of the invention.

Referring now to the drawings, there is illustrated a suspension system 12 for trailers, tractors and the like. Generally, a suspension system is used on each side of the trailer or tractor. For purposes of simplicity, only one such suspension system is shown.

The suspension system 12 couples a pair of axles 14 and 16 to a trailer bed generally designated by the numeral 18 through a load bearing cylindrical support 30 known as a trunnion axle. Each of the axles is adapted to have mounted thereon in conventional fashion wheels as shown in the phantom lines in FIG. 1.

The suspension system comprises a spring assembly 20 comprising a plurality of conventional spring leaves held in operative relationship by brackets 22 and a bolt 24. Axle connections 26 are provided on each end of the spring assembly 20 to couple the spring assembly to the axles in a well-known manner. A trunnion assembly 28 is secured to a central portion of the spring assembly 20 for coupling the spring assembly 20 to the trunnion axle 30. The trunnion axle 30 extends through the trunnion assembly 28 and has non-rotatably secured thereto a trunnion clamp 32. A free bracket 36 (FIG. 2) is welded at the bottom thereof to the top of the trunnion clamp 32 and is welded at the top thereof to the bed of the trailer. A frame flange 38 is secured to the top of the frame bracket 36 and to a longitudinal frame support 40 of the trailer bed 18. The structure generally described above is well-known in the art of suspension systems and further discussion thereof is believed unnecessary.

Figure 2:
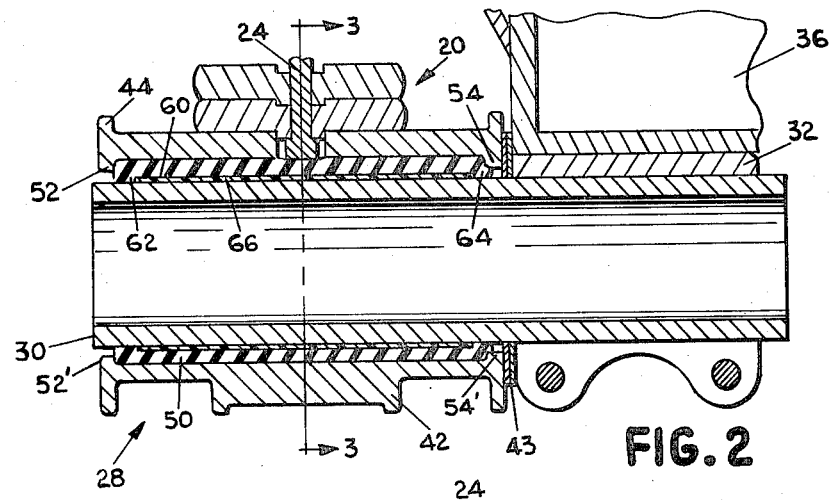
FIG. 2 is a partial sectional view along lines 2—2 of FIG. 1.

The trunnion assembly 28 comprises a trunnion cap 42 and a trunnion spring seat 44 which are secured together around the trunnion axle 30 by U-bolts 46 forming a collar therefor. A trunnion saddle casing 48 is positioned between the bight of the U-bolts and the top of the spring assembly 20. Spacer washers 43 are provided between the trunnion clamp 32 and the trunnion assembly 28 as illustrated in FIG. 2. A yieldable and compressible annular bushing 50 is provided between the trunnion axle 30 and the trunnion cap 42 and trunnion spring seat 44. Desirably, the bushing 50 is made of rubber.

The trunnion spring seat 44 has elongated grooves 56 on either side thereof. The bushing 50 is compressed into the grooves 56 and 58 to restrain rotational movement of the bushing 50 with respect to the trunnion cap 42 and the trunnion spring seat 44. The trunnion spring seat 44 and the trunnion cap 42 have inwardly turned ends 52 and 52' respectively at the outer ends thereof, and inwardly turned ends 54, 54' respectively at the inner ends thereof to restrain axial movement of the resilient bushing 50 with respect to the trunnion cap 42 and the trunnion spring seat 44.

Figure 3:
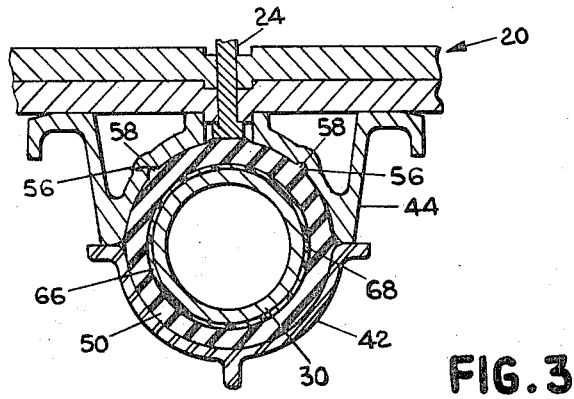
FIG. 3 is a sectional view taken along line 3—3 of FIG. 2.

According to the invention, the bushing 50 has an elongated annular recessed central portion 60 having inwardly directed retaining ends 62 and 64. A split lubricated liner 66 is positioned within the recessed central portion 60 between the trunnion axle 30 and the central portion of the annular bushing 50 to provide a lubricating surface therebetween. As illustrated in FIG. 3, the liner 66 is split, and has an inner diameter or inner circumference slightly less than the outer diameter or circumference of the axle 30. The difference results in a small space 68 along one side of the line. The size of the space is small, being about one-eighth inch. The gap is preferably positioned on a horizontal plane through the center line of the axle. The liner provides a lubricant between the bushing 50 and the trunnion axle 30. The retaining ends 62 and 64 of the bushing 50 encase the liner within the bushing 50 to prevent dirt and moisture from contact with the liner 66. The trunnion cap 42 and the trunnion spring seat 44 are in compressive relationship to the bushing 50 thereby compressing the bushing against the trunnion axle 30 at the retaining ends 62 and 64 of the bushing 50, and compressing the bushing 50 against the liner 66 in the central portion.

In normal operation of the suspension system illustrated in FIGS. 1–3, the trunnion assembly will rotate about the trunnion axle 30 with the lubricating liner 66 providing a lubricating surface between the bushing 50 and the axle 30. Loads on the trailer bed will thus be evenly distributed between the two axles 14 and 16. Further, the trailer bed 18 will be freely rotatable with respect to the suspension system for loading of flat bed trailers, for example, or for dumping loads on dump trailers. The movement between the liner 66 and the trunnion axle 30 during operation of the suspension system may in time result in some wear of the liner 66. The spacing 68 permits the liner 66 to readjust as wear occurs so that the liner 66 is maintained in tight conformity against the trunnion axle 30. Thus, as the liner wears, the spacing 68 will decrease.

Figure 4:
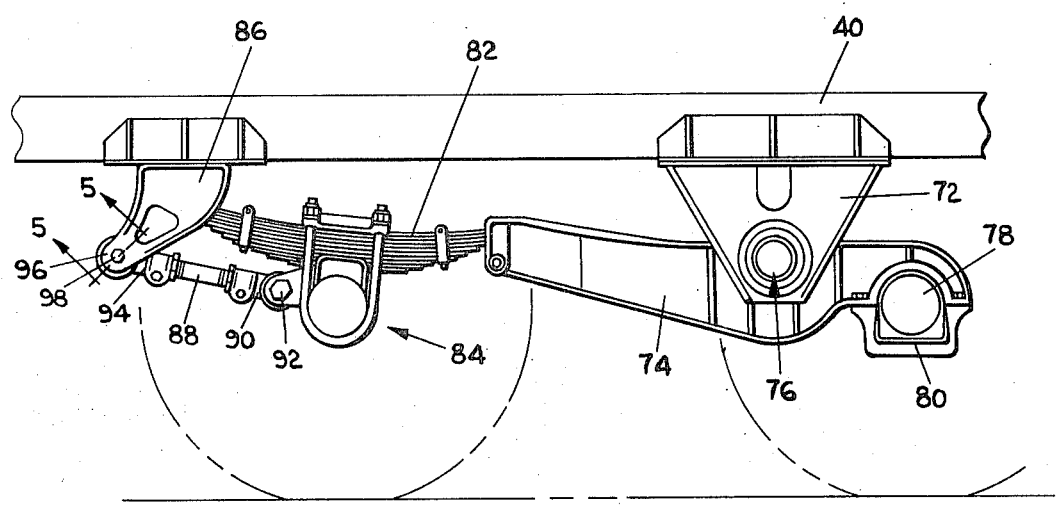
FIG. 4 is a side elevational view of a second trailer suspension employing bearing constructions according to the invention and illustrating a second embodiment of the invention.
Figure 5:
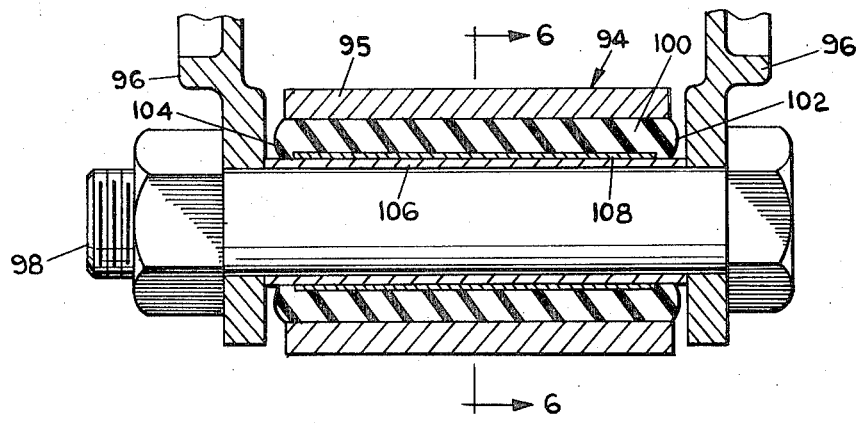
FIG. 5 is a sectional view along lines 5—5 of FIG. 4.
Figure 6:
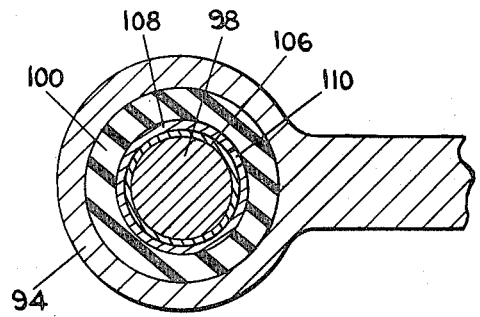
FIG. 6 is a partial sectional view along lines 6—6 of FIG. 5.

Referring now to FIGS. 4 – 6 will illustrate a second embodiment of the invention, there is illustrated a suspension system for a trailer having a trailer bed frame member 40. A trunnion frame bracket 72 is secured to the underside of the frame 18 and a beam assembly 74 is pivotably mounted to the frame bracket 72 through a trunnion assembly 76 which can be of a construction similar to that trunnion assembly illustrated in FIGS. 2 and 3 and having a novel bearing assembly as illustrated in FIGS. 2 and 3. An axle assembly 78 includes an axle casting 80 which is welded to the axle. A leaf spring assembly 82 is pivotably mounted to one end of the beam assembly 74 in a conventional manner and at the other end is mounted in a conventional manner to a spring hanger bracket 86 which is secured to the frame member 40. An axle mounting 84 is secured to a central portion of the leaf spring assembly 82 for supporting a second axle in a well-known manner. Wheels illustrated in phantom lines in FIG. 4 show the relationship between the wheels and the suspension system.

A radius rod 88 has pivotable coupling members 90 and 94 secured to either end thereof for pivotably mounting the radius rod 88 to the axle mounting assembly 84 at one end and to the spring hanger bracket 86 at the other end. Each of the coupling members 90 and 94 have annular sleeves for receiving bolts about which the radius rod 88 rotates. To this end, a bolt 92 is secured to the axle mounting assembly 84 and pivotally supports the radius rod 88 through the sleeve on coupling member 90.

The spring hanger bracket 86 has a pair of depending flanges 96 with holes for receiving a bolt 98. The coupling member 94 has an annular sleeve 95 for pivotally mounting the radius rod 88 on the spring hanger bracket 86. The bolt 98 extends between the depending flanges 96 of the spring hanger bracket 86 and through sleeve 95 for pivotably mounting the coupling member 94 to the spring hanger bracket 86.

According to the invention, a novel bearing assembly is provided between the coupling member 94 of the radius rod 88 and the bolt 98. Such bearing assembly includes a yieldable and compressible annular bushing 100 having inwardly turned ends 102 and 104. The bushing 100 is compressed and press-fit within the sleeve 95. A split lubricating liner 108 is provided within the bushing 100 between the down-turned ends 102 and 104. A sleeve 106 is press-fit into the bushing 100 and in contact with the liner 108. The split lubricating liner is cylindrical in shape and has an inner diameter or inner circumference slightly less than the outer diameter or circumference of the sleeve 106. This difference results in an open slot running along the entire length of the liner, the slot leaving an elongated space 110 defined by the edges of the liner, the bushing 100 and the cylindrical metal sleeve 106. As illustrated in FIG. 5, the depending flanges 96 are clamped by the bolt tightly against the sleeve 106 so that the sleeve 106 remains fixed with respect to the bolt 98.

The bearing assembly is assembled as follows: The compressible bushing 100 is first press-fit within the sleeve 95. The split lubricating liner 108 is then positioned within bushing 100 between the down-turned ends 102 and 104. The shape-retaining sleeve 106 is then press-fit within the bushing 100 and lubricating liner 108. The complete assembly is then positioned between the depending flanges 96 of the spring hanger bracket 86 and the bolt 98 is secured thereto. Tightening of the bolt 98 clamps the sleeve 106 between the depending flanges 96 so that the sleeve 106 is rigidly clamped between the flanges 96.

The bushing assembly permits the radius rod 88 to rotate freely about the bolt 98 with respect to the spring hanger bracket 86 with the lubricating liner 108 providing lubrication between the cylindrical metal sleeve 106 and the bushing 100. Yet the compressible bushing 100 gives the joint flexibility or resiliency. As the lubricating liner 108 wears during normal operation, the liner will "grow" around the sleeve 106 and the space 110 will become smaller, allowing the liner 108 to maintain its close and substantially complete contact with the sleeve 106. In this embodiment of the invention, the sleeve 106 and bolt 98 become the cylindrical support about which the compressible bushing 100 rotates. Although not specifically shown, the bearing assembly between radius rod 88 and bolt 98 can also be used between radius rod 88 and bolt 92.

The bearing structure provides a long lasting and effective bearing which requires minimum maintenance. It permits relatively free rotation between suspension members to assure even distribution of loads between tandem axles as, for example, on trailer vehicles. Further, the use of the bearing construction on trunnion axles for a tandem axle suspension permits rotation of the trailer bed about the axles for dumping, as in the case of dump trailers, or for loading, as in the case of flat bed trailers.

The bearing construction has been described with reference to two particular suspension systems. However, it is within the scope of the invention to use the bearing construction on other suspension systems wherein trunnion bearings and radius arm bearings are provided. Such other suspensions are well-known in the truck and trailer art. Further, the invention can be employed in any suspension system for a rubber bushed bearing between any cylindrical member such as a bolt, sleeve, or axle and an arm or other structural component which is pivotably mounted on the cylindrical member for rotation about the axis of the longitudinal member.

The invention has been described above with reference to a shaft which is fixed with respect to the frame of the vehicle and a collar of the suspension system is rockable about the shaft. A reversal of parts, namely a collar fixed to the frame and a shaft supported by the suspension system would achieve the same result and such a system is within the scope of the invention.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a vehicle having a load bearing or force restraining cylindrical support, such as an axle, trunnion or the like, means secure said support to said vehicle, and suspension means couple said support to wheel axles of said vehicles such that at least portions of said suspension means are rockable about said support, said suspension means portions including a collar surrounding at least a portion of said support, said suspension means also including a bearing structure between said collar and said support, the improvement in said bearing structure comprising:

a yieldable member surrounding a portion of said support and within said collar, said collar being at least substantially coextensive with said yieldable member and compressing said yieldable member radially inwardly toward said support; and a substantially cylindrical liner within said yieldable member extending at least substantially completely around said support and in contact therewith, said liner having lubricating properties and providing a lubricating surface for movement of said bearing about said support said liner being substantially shorter in length than said yieldable member, with portions of said yieldable member extending axially of said liner on each end thereof and compressed into engagement with said cylindrical support to form a pressure seal for said bearing against dirt, moisture, and the like.

2. The combination of claim 1 wherein said liner is longitudinally split and has an inner diameter slightly less than the outer diameter of said support whereby a small slot is formed at the split edge of said liner to permit adjustment of said liner about said support and to maintain substantially complete contact between said liner and said support as said liner wears.

3. The combination of claim 2 wherein said liner is made from a self-lubricating organic material.

4. The combination of claim 2 wherein said liner is made from an inorganic nonmetallic lubricated fibrous material.

5. The combination of claim 2 wherein said support includes an annular sleeve and said lubricating liner surrounds at least a portion of said sleeve.

6. The combination of claim 5 wherein said suspension means portions includes a radius rod having said collar at one end thereof, and means rotatably coupling another end of said radius rod to one of said vehicle axles.

7. The combination of claim 2 wherein said suspension means includes resilient means between said collar and said vehicle axles for cushioning movement of said vehicle axles with respect to said support, and said collar includes first and second members which are secured together around said yieldable member.

8. The combination of claim 1 wherein said liner is made from a self-lubricating organic material.

9. The combination of claim 1 wherein said liner is made from a nonmetallic, inorganic, self-lubricating fiberous material.

10. The combination of claim 1 wherein said support includes an annular sleeve and said lubricating liner surrounds at least a portion of said sleeve.

11. In a vehicle suspension system for coupling wheel supporting axles to the vehicle frame, said suspension system includes a load bearing or force restraining cylindrical support, a rockable member coupled to said support through a collar which surrounds at least a portion of said support, and a bearing structure between said support and said collar, the improvement in said bearing structure comprising:

a yieldable member surrounding a portion of said support and positioned within said collar, said collar being at least substantially coextensive with said yieldable member and compressing and yieldable member radially inwardly toward said support; and a substantially cylindrical liner within said yieldable member extending at least substantially completely around said support and in contact therewith, said liner having lubricating properties and providing a lubricating surface for movement of said bearing about said support, said liner being substantially shorter in length than said yieldable member, with portions of said yieldable member extending axially of said liner on each end thereof, and compressed into engagement with said cylindrical support to form a pressure seal for said bearing against dirt, moisture, and the like.

12. The vehicle suspension system of claim 11 wherein said liner is longitudinally split and has an inner diameter slightly less then the outer diameter of said support whereby a small slot is formed at the split edge of said liner to permit adjustment of said liner about said support and to maintain substantially complete contact between said liner and said support as said liner wears.

13. The vehicle suspension system of claim 11 wherein said liner is formed of a solid organic polymer of polytetrafluorothylene, polythylene, or polypropylene.

* * * * *